United States Patent [19]
Arkles

[11] Patent Number: 4,478,981
[45] Date of Patent: Oct. 23, 1984

[54] MIXTURES OF POLYACRYLATE RESINS AND SILOXANE CARBONATE COPOLYMERS

[75] Inventor: Barry C. Arkles, Oreland, Pa.

[73] Assignee: Petrarch Systems Inc., Levittown, Pa.

[21] Appl. No.: 360,525

[22] Filed: Mar. 22, 1982

[51] Int. Cl.$^3$ .................. C08L 33/08; C08L 33/10; C08L 33/12; C08L 69/00

[52] U.S. Cl. .................................. 525/92; 525/100; 525/148; 525/464; 525/468; 525/479

[58] Field of Search ............... 525/92, 101, 148, 464, 525/468, 474, 479, 100

[56] References Cited

U.S. PATENT DOCUMENTS

| | | | |
|---|---|---|---|
| 3,640,943 | 2/1972 | Bostick et al. | 525/92 |
| 3,787,238 | 1/1974 | Juliano | 525/479 |
| 3,808,178 | 4/1974 | Gaylord | 526/279 |
| 3,880,783 | 4/1975 | Serini et al. | 525/464 |
| 4,120,570 | 10/1978 | Gaylord | 526/279 |
| 4,139,513 | 2/1979 | Tanaka et al. | 204/159.22 |
| 4,139,692 | 2/1979 | Tanaka et al. | 526/218 |
| 4,152,508 | 5/1979 | Ellis et al. | 526/279 |
| 4,153,641 | 5/1979 | Deichert et al. | 264/1 |
| 4,319,003 | 3/1982 | Gardlund | 525/148 |

FOREIGN PATENT DOCUMENTS 7318111 1/1974 France .

OTHER PUBLICATIONS

Mandell, Robert B., "Corneal Physiology and Permeable Materials", Contact Lens Manufacturers Association, (1981).

Arkles, Barry C., "New Generation Silicones for Medical Devices", *Medical Device & Diagnostic Industry*, vol. 3, No. 4, Apr. 1981, Canon Communications, Inc.

"Polycon" Lense Advertisement.

*Primary Examiner*—Wilbert J. Briggs, Sr.
*Attorney, Agent, or Firm*—Panitch Schwarze Jacobs & Nadel

[57] ABSTRACT

Contact lenses are fabricated from a mixture of polymethymethacrylate and polydimethylsiloxane-bisphenol A carbonate block copolymers. The lenses so produced exhibit excellent oxygen permeability.

11 Claims, No Drawings

MIXTURES OF POLYACRYLATE RESINS AND SILOXANE CARBONATE COPOLYMERS

BACKGROUND OF THE INVENTION

This invention relates to mixtures of polyacrylate resins and siloxane carbonate copolymers for use in fabricating contact lenses. More particularly, this invention concerns mixtures of polymethylmethacrylate (PMMA) and polydimethylsiloxane-bisphenol A carbonates.

Polymethylmethacrylate and similar polyacrylate resins are frequently utilized to fabricate contact lenses since they offer a combination of exemplary properties including clarity, flexibility, dimensional stability and durability. The low oxygen permeability of contact lenses fabricated from these materials, however, often results in corneal edema since ocular tissue satisfies some of its oxygen requirements by direct atmospheric contact. Consequentially, a significant portion of the population cannot comfortably wear lenses of the polyacrylate class. In all cases, extended wear of such polyacrylate lenses is not recommended.

The slightly enhanced permeability of most soft lens systems now on the market is not adequate to compensate for this deficiency, and the preciseness of optics, including the ability to correct for astigmatism is sacrificed. An excellent paper dealing with oxygen permeability of contact lenses is "Corneal Physiology And Permeable Materials" by Robert B. Mandell which was delivered in New Orleans, La. on Oct. 22, 1981, published by Contact Lens Manufacturers Association.

The incorporation of various siloxane containing methacrylate monomers into copolymers has been shown to increase the oxygen permeability of polyacrylate resins. U.S. Pat. Nos. 3,808,178; 4,139,513; 4,139,692; 4,152,508 and 4,153,641 are indicative of this approach. The use of methacrylate silicones for contact lenses is described in "New-Generation Silicones For Medical Devices" by Barry C. Arkles (the applicant herein), *Medical Device & Diagnostic Industry*, Volume 3, No. 4, April 1981, Canon Communications, Inc.

SUMMARY OF THE INVENTION

There has now been discovered a new composition comprising a mixture or alloy of a polyacrylic resin and a siloxane-carbonate copolymer. This composition is particularly useful in fabricating contact lenses since it enhances the oxygen permeability of polyacrylic resins. A particularly preferred mixture is polymethylmethacrylate and polydimethylsiloxane-bisphenol A carbonate copolymer.

The mixtures of this invention possess excellent optical, mechanical and oxygen transmission properties. These mixtures behave homogeneously during melt processing and microblock phase separation is not observed.

DETAILED DESCRIPTION OF THE PREFERRED EMBODIMENTS

The silicone polycarbonate (siloxane-carbonate) copolymers of this invention are illustrated by the preferred polydimethylsiloxane-bisphenol A carbonate copolymers which have the following general structure:

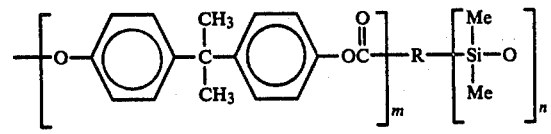

R may be oxygen or may be:

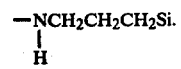

Although random copolymers can be used, block copolymers are generally preferred. Copolymers can have the following configurations:

| |
|---|
| random copolymer |
| XXYYYXYXYYYXXXXY |
| block copolymer |
| XXX-YYY-XXX-YYY; XX-XXY-YYXX-XXYY-YY |
| alternating copolymer |
| XYXYXYXYXYXY |
| graft copolymer |
| XXXXXXXXXXX |
| Y Y Y |
| Y Y Y |
| Y Y Y |
| Y Y Y |

Block copolymers are composed of (not necessarily equal) alternations of runs of each of the two monomers forming the copolymer. Whereas random copolymers exhibit properties which are generally intermediate those of the monomers, block copolymers tend to exhibit the properties of each of the monomers.

Block copolymers of poly(ethylene and propylene oxides) are now being produced for use as surface-active agents. The reaction of certain polyesters made from two or more glycols and reacted with a diisocyanate to form terephthalic acid with ethylene glycol and other glycols has been reported. Polysulfide resins may be used to link epoxy resins and thus form alternating blocks. Similarly, reactions between epoxy resins and compounds containing reactive methylol groups, such as phenolic-, urea-, and melamine-formaldehyde intermediates, can be made to form block copolymers. As may be noted from the above examples, it is usually easier to form block copolymers by condensation reactions than from addition reactions, although recent success in the latter field has been reported.

The transition from the siloxane portion to the bisphenol A carbonate portion of the silicone polycarbonate copolymer may be directly through a phenolic oxygen. In block copolymers the transition may be from a carboxypropyl or aminopropyl terminated siloxane which reacts with phosgene during polymerization of the bisphenol A block. These materials are described by Noshay & McGrath in *Block Copolymers*, Wiley Publishers, 1978.

Polymethylmethacrylate is one example of a polyacrylate that can be utilized in this invention. While it is preferred to use a linear, optical grade of thermoplastic polymethylmethacrylate, copolymers and cross-linked grades may also be employed. Typical comonomers include methacrylic acid, acrylic acid, ethylmethacrylate, cyclohexylmethacrylate, dimethyl itaconate and tris(trimethylsiloxy)propylmethacrylate. Primary reasons for using non-homopolymer materials include altering refractive index, increasing wettability and improving dimensional stability.

The siloxane-carbonate copolymer component of the mixture or alloy of this invention makes up between about 0.5 and about 50 weight percent, and preferably between about 2.0 and about 20.0 weight percent of the total mixture.

The invention is further described by reference to the following specific, non-limiting examples.

EXAMPLE 1

A polymethylmethacrylate homopolymer, namely, Plexiglas VM100 by Rohm & Haas, was combined with 10 weight percent polydimethylsiloxane 50-55% bisphenol A carbonate block copolymer (i.e., the copolymer contained 50-55 weight percent polydimethylsiloxane). The molecular weight of the copolymer was in the range of about 15,000 to 25,000. The DP (degree of polymerization) of the dimethylsiloxane unit was greater than 4 (i.e., n is greater than 4 in the above formula). The materials were predried and then melt-mixed in a single-screw vented extruder at cylinder temperatures of 425°-460° F. The extrudate was air cooled and chopped to ⅛" pellets. The pelletized resultant mixture was then molded. The mixture demonstrated the following properties:

| Water Absorption, 24 hours | 0.7% |
| --- | --- |
| Flexural Strength | 10,700 psi |
| Flexural Modulus | 370,000 psi |
| Izod Impact Strength, | |
| notched | 0.3 ft-lbs-in |
| unnotched | 1.7 ft-lbs-in |
| Refractive Index | 1.49 |

Contact lenses were molded from the above polymer mixture. The equivalent oxygen percentage (EOP) was determined to be as followed:

| 0.25 mm lens | 7.7% |
| --- | --- |
| 0.10 mm lens | 10.0% |

(The EOP of air is 21%)

EXAMPLE 2

A concentrated solution of polydimethylsiloxane-bisphenol A carbonate block copolymer in methylene chloride was prepared by adding the block copolymer into warm methylene chloride until no more dissolved. This concentrated solution was added to a mixture of methyl methacrylate and ethylene glycol dimethacrylate. The methylene chloride was evaporated leaving a 5:94:1 mixture of the respective components. The mixture was nitrogen purged. The polymerization was initiated at 50° C. with a catalyst, namely, t-butyl peroxy neodecanoate. A stiff optically clear dimensionally stable polymer mixture was formed. This mixture was an alloy with cross-linking of the methacrylate portion. The EOP was 3% for a 0.25 mm lens.

The present invention may be embodied in other specific forms without departing from the spirit or essential attributes thereof and, accordingly, reference should be made to the appended claims, rather than to the foregoing specification, as indicating the scope of the invention.

I claim:

1. A composition comprising an oxygen-permeable, transparent alloy of a polyacrylic resin and a siloxane-carbonate copolymer comprising an organo polysiloxane-bisphenol A carbonate block copolymer.

2. A composition according to claim 1 wherein said siloxane-carbonate copolymer comprises polydimethylsiloxane-bisphenol A carbonate block copolymer.

3. A composition according to claim 2 wherein said polydimethylsiloxane comprises between about 50 and about 55 weight percent of the copolymer.

4. A composition according to claim 1 wherein said polyacrylic resin is polymethylmethacrylate.

5. A composition according to claim 1 wherein said copolymer comprises between about 0.5 and about 50 weight percent of said composition.

6. A composition according to claim 1 wherein said copolymer comprises between about 2 and about 20 weight percent of said composition.

7. A method of producing the composition of claim 1, 2, 3, 4, 5 or 6 which comprises melt mixing.

8. A method of producing the composition of claim 1, 2, 3, 4, 5 or 6 which comprises polymerizing acrylate monomer in the presence of said siloxane-polycarbonate copolymer.

9. Contact lenses fabricated from the compositions of claim 1, 2, 3, 4, 5 or 6.

10. Contact lenses produced by the method of claim 7.

11. Contact lenses produced by the method of claim 8.

* * * * *